United States Patent [19]

Kerns

[11] Patent Number: 5,596,736
[45] Date of Patent: Jan. 21, 1997

[54] DATA TRANSFERS TO A BACKING STORE OF A DYNAMICALLY MAPPED DATA STORAGE SYSTEM IN WHICH DATA HAS NONSEQUENTIAL LOGICAL ADDRESSES

[75] Inventor: Randy G. Kerns, Boulder, Colo.

[73] Assignee: Fujitsu Limited, Kanagawa, Japan

[21] Appl. No.: 920,196

[22] Filed: Jul. 22, 1992

[51] Int. Cl.$^6$ .............................. G06F 13/00; G06F 12/00
[52] U.S. Cl. .................... 395/404; 395/412; 395/413; 395/427; 395/497.01; 395/497.02; 395/497.03; 364/245; 364/DIG. 1
[58] Field of Search ................................... 395/600, 425, 395/575, 404, 412, 413, 427, 497.01

[56] References Cited

U.S. PATENT DOCUMENTS

| | | | |
|---|---|---|---|
| 4,636,946 | 1/1987 | Hartung et al. | 364/DIG. 1 |
| 5,029,125 | 7/1991 | Sciupac | 364/900 |
| 5,155,835 | 10/1992 | Belsan | 395/425 |
| 5,193,184 | 3/1993 | Belsan et al. | 395/600 |
| 5,210,866 | 5/1993 | Milligan et al. | 395/575 |
| 5,214,781 | 5/1993 | Miki et al. | 395/600 |
| 5,257,352 | 10/1993 | Yamamoto et al. | 395/275 |
| 5,394,537 | 2/1995 | Courts et al. | 395/425 |
| 5,473,761 | 12/1995 | Parks et al. | 395/404 |

FOREIGN PATENT DOCUMENTS

| | | |
|---|---|---|
| WO91/16711 | 10/1991 | WIPO. |
| WO91/20025 | 12/1991 | WIPO. |
| WO91/20076 | 12/1991 | WIPO. |

OTHER PUBLICATIONS

Young, Mark S., *Computer Design*, "Controllers Wring Peak Performance Out of Disk Drives," May 1985, pp. 119–127.
Grossman, C. P., *IBM Systems Journal*, "Cache–DASD Storage Design for Improving System Performance," 1985, pp. 316–334.
Grossman, C. P., *IBM Systems Jorunal*, "Evolution of the DASD Storage Control," 1989, pp. 196–226.
Cohen, E. I, King, G. M. & Brady, J. T., *IBM Systems Journal*, "Storage Hierarchies," 1989, pp. 62–76.
Gelb, J. P., *IBM Systems Journal*, "System–Managed Storage," 1989, pp. 77–103.

*Primary Examiner*—Thomas G. Black
*Assistant Examiner*—Hosain T. Alam
*Attorney, Agent, or Firm*—Sheridan Ross & McIntosh

[57] ABSTRACT

A destaging method for a mapped data storage system is provided for writing data to a backing store. Data having non-sequential logical addresses are grouped together. The data includes data segments. A maximal difference in size between two data segments is less than a predetermined value. A constructed data segment includes a particular data item when the particular data item has a logical address between logical addresses of two other data items when they are part of this same constructed data segment. After being grouped together, such data is destaged from a cache memory to the backing store. Data from a group is transferred to an unallocated storage area of the backing store nearest to the physical position of the data transfer head responsible for the transfer. Each such transfer is continuous while reducing seek and/or latency delays and without regard to the nonsequential logical addresses of the data being transferred.

16 Claims, 5 Drawing Sheets

LOGICAL DEVICES

DATA
STORAGE
UNIT

| 24a | $LD_2, LD_3$ |
|-----|--------------|
| 24b | $LD_1$       |
| 24c | $LD_6$       |
| 24d | $LD_4, LD_5$ |

$504 \diagup \begin{array}{l}(D_8, LD_3, 75)\\(D_9, LD_2, 80)\end{array}$ $508 \diagup (D_2, LD_1, 50)$ $512 \diagup \begin{array}{l}(D_1, LD_4, 350)\\(D_3, LD_5, 300)\\(D_4, LD_4, 398)\\(D_5, LD_4, 100)\\(D_6, LD_4, 400)\\(D_7, LD_4, 399)\end{array}$ (b)

$516 \diagup \begin{array}{l}(D_9, LD_2, 80)\\(D_8, LD_3, 75)\end{array}$ $508 \diagup (D_2, LD_1, 50)$ $520 \diagup \begin{array}{l}(D_5, LD_4, 100)\\(D_1, LD_4, 350)\\(D_4, LD_4, 398)\\(D_7, LD_4, 399)\\(D_6, LD_4, 400)\\(D_3, LD_5, 300)\end{array}$ (c)

$524 \diagup \begin{array}{l}(D_5, LD_4, 100)\\(D_1, LD_4, 350)\end{array}$ $528 \diagup \begin{array}{l}(D_4, LD_4, 398)\\(D_7, LD_4, 399)\\(D_7, LD_4, 400)\\(D_3, LD_5, 300)\end{array}$ (d)

FIG. 5

DATA TRANSFERS TO A BACKING STORE OF A DYNAMICALLY MAPPED DATA STORAGE SYSTEM IN WHICH DATA HAS NONSEQUENTIAL LOGICAL ADDRESSES

FIELD OF THE INVENTION

The present invention relates to data destaging operations in a dynamically mapped data storage system and, in particular, to a method for efficiently writing data from a cache memory to a backing store such that data with nonsequential logical addresses is written to the backing store while substantially avoiding seek and latency delays.

BACKGROUND OF THE INVENTION

The architectures of peripheral data storage systems have become increasingly varied and sophisticated. However, in order to allow data exchanges with a wide variety of host computational systems, many data storage systems store data substantially differently from the architectural appearance that is presented to a host computational system. These data storage systems emulate simpler data storage system architectures which a wide variety of host systems and host system administration personnel can readily understand and manipulate. To accomplish this, such data storage systems, generally referred to as "mapped data storage systems," provide or store at least one map or table for mapping blocks of data between their physical locations on the backing store of the data storage system and the logical address locations perceived by the host systems. In particular, for a backing store having disk storage devices, such mappings translate between the logical address scheme (which typically includes a logical device identification and a logical data address for locations within the logical device) used by a host computational system and the physical addressing scheme (which typically includes cylinder track and sector locations) used by the backing store as is well known in the art. Thus, for a host to access data on a mapped data storage system, the host system provides the mapped data storage system with the logical address of the data, the mapped data storage system then uses a mapping table to look up the physical storage location corresponding to the logical address and subsequently locates the data and transfers it to the host.

As a further enhancement, some data storage systems, known as "dynamically mapped data storage systems," do not require that the mapping between logical and physical addresses be fixed. That is, a dynamically mapped data storage system can relocate data on the backing store transparently to the activities of any host system. This feature allows the data storage system, for example, to efficiently store variable length data resulting from data compaction techniques, since fragmentation of the backing store can be alleviated by relocating stored data such that unallocated storage fragments can be coalesced. Thus, as the physical address where a data item is stored varies, the stored mapping associating logical and physical addresses is modified.

In yet another, departure from the data storage architecture perceived by a host system, it is also common practice for mapped data storage systems to provide a data caching mechanism such that frequently referenced data can be transferred at electronic speeds to and from a host system. Such a cache typically becomes the data storage system interface between the backing store and the host system. Therefore, all host system input and output to the data storage system, at least temporarily, resides in the cache memory and the cache or a related controller is responsible for both staging data (i.e., reading data from the backing store into the cache memory) and destaging data (i.e., writing data from the cache memory to the backing store). Moreover, it is known that as a cache memory increases in size, there is an increased likelihood of the requested data being in the cache and, thus, faster data transfers occur between a host computational system and the data storage system. It is also known that as a cache memory increases in size, the proportion of data stages over data destages decreases substantially. This is due to the facts that: (i) in general, a substantial majority of the data transfer activity between a host computational system and a data storage system is directed at only a small percentage of the data. Therefore, by having a sufficiently large cache memory, a substantial portion of the most active data can remain in the cache memory without restaging, and (ii) regardless of the cache memory size, to assure data persistence and integrity, destaging operations are periodically required for modified data residing in the cache memory. Thus, since many mapped data storage systems can have large cache memories, data destages become a significant bottleneck to increasing overall sustained data transfer rates with host systems.

It would, therefore, be advantageous to substantially speed up the destaging process without substantially decreasing the overall efficiency of a dynamically mapped data storage system. The present invention is intended to attain this advantage by substantially decreasing the time taken in locating and writing to unallocated storage area(s) on the backing store where data is to be destaged.

SUMMARY OF THE INVENTION

The present invention relates to a method and apparatus for efficiently destaging data within a dynamically mapped data storage system. Specifically, the invention relates to efficiently transferring or destaging data from a cache memory of a dynamically mapped data storage system to a backing store of the dynamically mapped data storage system where the backing store includes a collection of one or more electromechanical storage devices having seek delay and latency delay. That is, the electro-mechanical storage devices experience data transfer delay caused by the movement of a data transfer head when the head must align with a specific portion or track of the physical storage medium (seek delay) and also experience data transfer delay caused by waiting for the desired data location on a rotating physical storage medium to become adjacent to the data transfer head (latency delay). Thus, for example, such electromechanical storage devices can be magnetic disks or drums, or optical disks.

By defining the term "sequential addresses" to mean a series of addresses such that for each address in the series the next address in the series is the next possible address (i.e., there are no address gaps or holes in the series), and by defining the term"nonsequential addresses" to mean that there are such gaps in the series (e.g., in the address series 128–512, 640–768, 1024–4096, there are gaps 513–639 and 769–1023), then the novel destaging invention can be described as the method and apparatus for writing cache memory data having host system nonsequential logical addresses onto an unallocated data storage area of the backing store of a dynamically mapped data storage system. Preferably, such data can be written while substantially avoiding seek and latency delays once writing to the physical medium of the area has begun. Moreover, the data storage area is determined such that there is little, if any, movement of the data transfer (i.e., read/write) head whenever there is a plurality of such available unallocated data storage areas.

The destaging process includes a grouping step which groups the data or data records of the cache memory being destaged according to a partitioning of the storage in the backing store. Specifically, the backing store is partitioned such that each host system logical device has its storage provided by a single backing store partition. Thus, the data records whose logical devices are assigned to a single partition of the backing store are grouped together. For each group, an ordering step then orders the data by logical address so as to cause data with consecutive logical addresses to be adjacent. Subsequently, the destaging process also includes a data storage assignment step where segments of the newly ordered data of a group are assigned storage on the backing store. It is important to note that these segments, denoted "data segments," are truly segments in the new ordering; that is, if a first data record has a logical address that is between the logical addresses of two other data records, and these latter two data records reside in a data segment, then the first data record must also reside in the data segment. Thus, the storage assignment step initially delegates each data record of a group to a data segment and thereafter each data segment is either written immediately to an unallocated storage area of the backing store such that there are no interrupting seek and latency delays once writing has commenced, or the data segment is decomposed into smaller data segments until data segments are obtained that can be written immediately to unallocated storage areas of the backing store such that there are no interrupting seek and latency delays once writing has commenced. Moreover, if a data segment is decomposed, the decomposition is done such that, whenever appropriate, data having sequential logical addresses are not decomposed into separate data segments.

In the preferred embodiments of the invention, each host system logical device is assigned to a single physical group or partition of the electromechanical storage devices contained in the backing store. Data records representing the cache memory data entries to be destaged are grouped such that each of these groups contains only those data records for one such partition of the backing store. Once grouped, for each group a write command transfers the group to the backing store where the data records are ordered. The ordering step linearly orders the data records of the group, first according to logical device and secondly by logical data address within each logical device. Subsequently, the data storage assignment step constructs a "data descriptor" for each data segment. That is, each such data descriptor describes its related data segment according to the new ordering of the data records. For example, the data descriptor includes a number of bits that identify the beginning logical address of the data segment and the number of data entries in that segment. Thereafter, each data descriptor is used to determine whether its data segment can be immediately written to an unallocated storage area available on the partition for the group. If there is more than one such unallocated storage area, then one is chosen such that there is minimal read/write head movement. If, however, no such backing store unallocated storage area is immediately available for the data segment, then the data descriptor is replaced by at least two new data descriptors. Each new data descriptor describes a new data segment such that when taken together the new data segments constitute a decomposition of the data segment whose data descriptor was replaced. For each new data descriptor, the procedure described above is reiterated. That is, each new data segment described by a new data descriptor is either written to an unallocated storage area from the partition of the backing store related to the group, or the new data descriptor is replaced by data descriptors describing still smaller data segments. Furthermore, techniques are used to facilitate keeping data records with sequential logical addresses from being separated into distinct data segments. Thus, a new data segment can have additional data records with sequential logical addresses whenever, for example, the size of the data segment remains below a predetermined proportion of the data segment from which it was derived, or, below the size of the largest available unallocated storage area.

In conjunction with the above destaging procedure, since the dynamically mapped data storage system can relocate backing store data such that a plurality of unallocated storage fragments can be used to create larger unallocated storage areas, for most initial data segments referenced in the data storage assignment step, no decomposition will be required. That is, a sufficiently large unallocated storage area will be found immediately. Thus, in most instances, at most one seek and latency delay is required to store the data contained in an initial data segment.

Furthermore, certain enhancements to the embodiments of this invention have been implemented. First, each partition of the backing store may additionally be partitioned by subcollections of logical devices. For example, a partition can have its storage subpartitioned such that each logical device related to the partition has a distinct storage location area that is easily located and manipulated by an operator. Of course, this implies that data segments for a group include only data records having the same logical device and the unallocated storage areas desired must be restricted to the appropriate subpartition. Secondly, if the backing store includes a plurality of electromechanical storage devices then the data segments can be distributed across the storage devices such that greater data transfer concurrency can be gained. Thirdly, the grouping step can be separated from the ordering and data storage assignment steps so as to distribute the destaging processing and thereby gain greater concurrency and data throughput. That is, the data record grouping step implementation can be assigned to a processor included in the dynamically mapped data storage caching control while the ordering and data storage assignment steps can be implemented by processor(s) included in the backing store. Fourthly, by providing the dynamically mapped data storage system with the capability to initiate processes to execute host system staging and destaging commands (e.g., stage data as a background process), the time required for such processes can be substantially offset for those host systems capable of sending such commands to the dynamically mapped data storage system.

Thus, the present invention and its embodiments provide a cost effective means to increase the data transfer rate between a host system and a dynamically mapped data storage system. By destaging data to a single data storage area regardless of whether the logical addresses associated with the data are sequential, fewer seeks and latencies are incurred. This significantly decreases the time required for destaging cache data while substantially not impacting the total time required for the staging of data. Moreover, the invention requires little or no additional hardware beyond what is already necessary for a mapped data storage system.

Other features and benefits of the present invention will become apparent from the detailed description and the accompanying Figures contained hereinafter.

BRIEF DESCRIPTION OF THE DRAWINGS

FIG. 2 illustrates a conceptual representation of the configuration table;

FIG. 5 provides an example illustrating how the present invention groups and orders data records.

DETAILED DESCRIPTION OF THE PREFERRED EMBODIMENT

Figure 1:
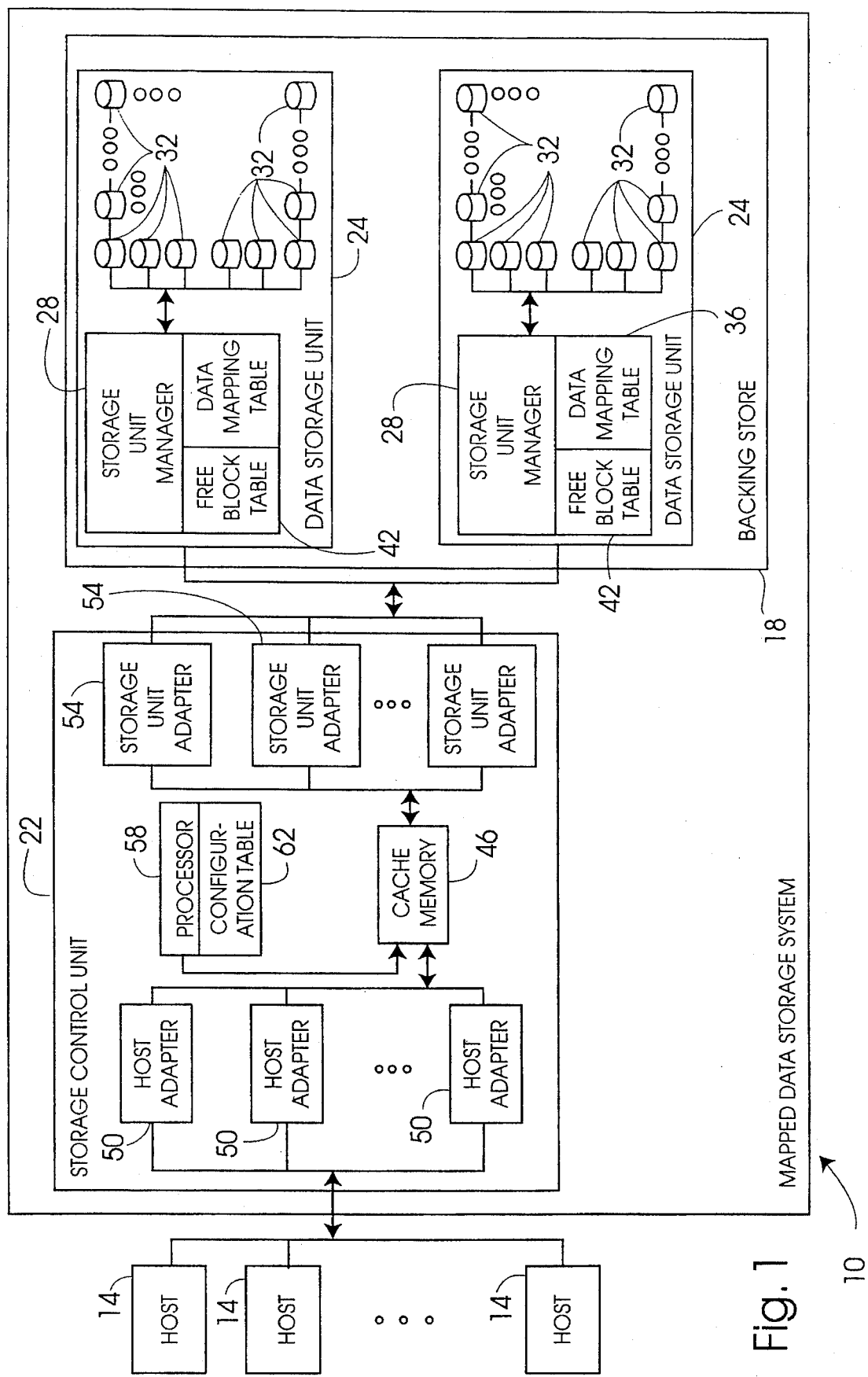
FIG. 1 is a block diagram illustrating the high level functional units of a dynamically mapped data storage system in which the present invention is embodied.

FIG. 1 presents a high level block diagram of the apparatus components of the dynamically mapped data storage system 10 of the present invention which hereinafter is referred to simply as the storage system 10. The connection between the storage system 10 and at least one host system 14 allows the storage system 10 to receive data from and transmit data to a host system 14 in response to host system 14 requests. Each host system 14 views the storage system 10 as if it were partitioned into a collection of virtual or logical devices for storing data with each such device having a plurality of addressable data storage locations. Thus, each host system 14 accesses a storage system 10 storage location by designating a logical address.

The storage system 10 includes a backing store 18 providing nonvolatile data storage and a storage control unit 22 which is responsible for data caching and data transfer control to/from both the host system 14 and the backing store 18.

In the preferred embodiment, the backing store 18 includes a plurality of data storage units 24 which provide the storage capacity for the backing store 18. Each data storage unit 24 functions autonomously from the other data storage units 24. Moreover, each logical device, as perceived by a host system 14, has its storage locations entirely within a single data storage unit 24. Thus, the data storage units 24 provide a physical partitioning of the collection of logical devices accessible to host systems 14. Each data storage unit 24, in turn, includes a storage unit manager 28 and a plurality of electromechanical storage devices 32. Each electromechanical storage device 32 is preferably a magnetic or optical disk storage device or a collection of such devices commonly referred to as a "Redundant Array of Inexpensive Disks" (RAIDS). Further, to simplify the discussion each such storage device 32 will be referred to as a "disk" hereinafter. Each disk 32 has its data storage medium partitioned into addressable physical data areas known as sectors or data blocks. Further, each disk 32 is connected to the storage unit manager 28. The storage unit manager 28 monitors and controls data transfers from and to the disks 32 of the data storage unit 24. Moreover, the storage unit manager 28 also relocates and compacts data residing in the data storage unit 24 such that small isolated unallocated storage areas are coalesced into larger unallocated storage areas. In one embodiment, the storage unit manager 28 has six data channels, each of which can support data transfers to seven disks 32. Thus, each storage manager 28 can support forty-two disks 32. The disks 32 can be used to store data in various formats. For example, if each of the disks 32 is an inexpensive magnetic disk, then they can be grouped together to form one or more RAIDS. Further, a data mapping table 36 is included in each storage unit manager 28 for translating between the logical addresses of the host system 14 and the physical addresses of the disks 32. Moreover, the storage unit manager 28 also includes a free block table 42 which indicates, for each connected disk 32, the locations of both the unallocated and allocated data blocks.

Returning now to the storage control unit 22, this component includes a cache memory 46 for buffering data between a host system 14 and the backing store 18. The cache memory 46 receives and transmits data from a host 14 by way of a host adapter 50. In addition, the cache memory 46 is partitioned into data entries, each such entry, preferably, is the size of the data blocks on the disks 32, or if not, then such entries are an integral multiple of the data block size. The storage control unit 22 contains a plurality of host adapters 50, each such adapter being capable of controlling the transfer of data between any host 14 and the cache memory 46. Similarly, the cache memory 46 receives and transmits data to a data storage unit 24 by way of a storage unit adapter 54. The storage control unit 22 also contains a plurality of storage unit adapters 54, each one capable of controlling the transfer of data between any data storage unit 24 and the cache memory 46. In addition, the storage control unit 22 includes at least one processor 58. The processor(s) 58 interprets host 14 data transfer commands, monitors and controls data transfers between the host adapters 50 and the cache memory 46 and between the storage unit adapters 54 and the cache memory 46. In addition, the processor(s) 58 initiates the staging and destaging of cache data. Note that hereinafter, for simplicity, one processor 58 is assumed, even though a plurality of processors 58 are preferred in some embodiments. Residing within the program data store associated with the processor 58 is a configuration table 62 for designating which logical devices reside on which data storage units 24. FIG. 2 provides an illustration of the configuration table 62 where there are four data storage units 24: 24a, 24b, 24c and 24d; and six logical devices: $LD_1$, $LD_2$, $LD_3$, $LD_4$, $LD_5$ and $LD_6$. For this example, logical devices $LD_2$, $LD_3$ are assigned to data storage unit 24a; logical device $LD_1$ is assigned to data storage unit 24b; logical device $LD_6$ is assigned to data storage unit 24c; and logical devices $LD_4$, $LD_5$ are assigned to data storage unit 24d.

Figure 3:
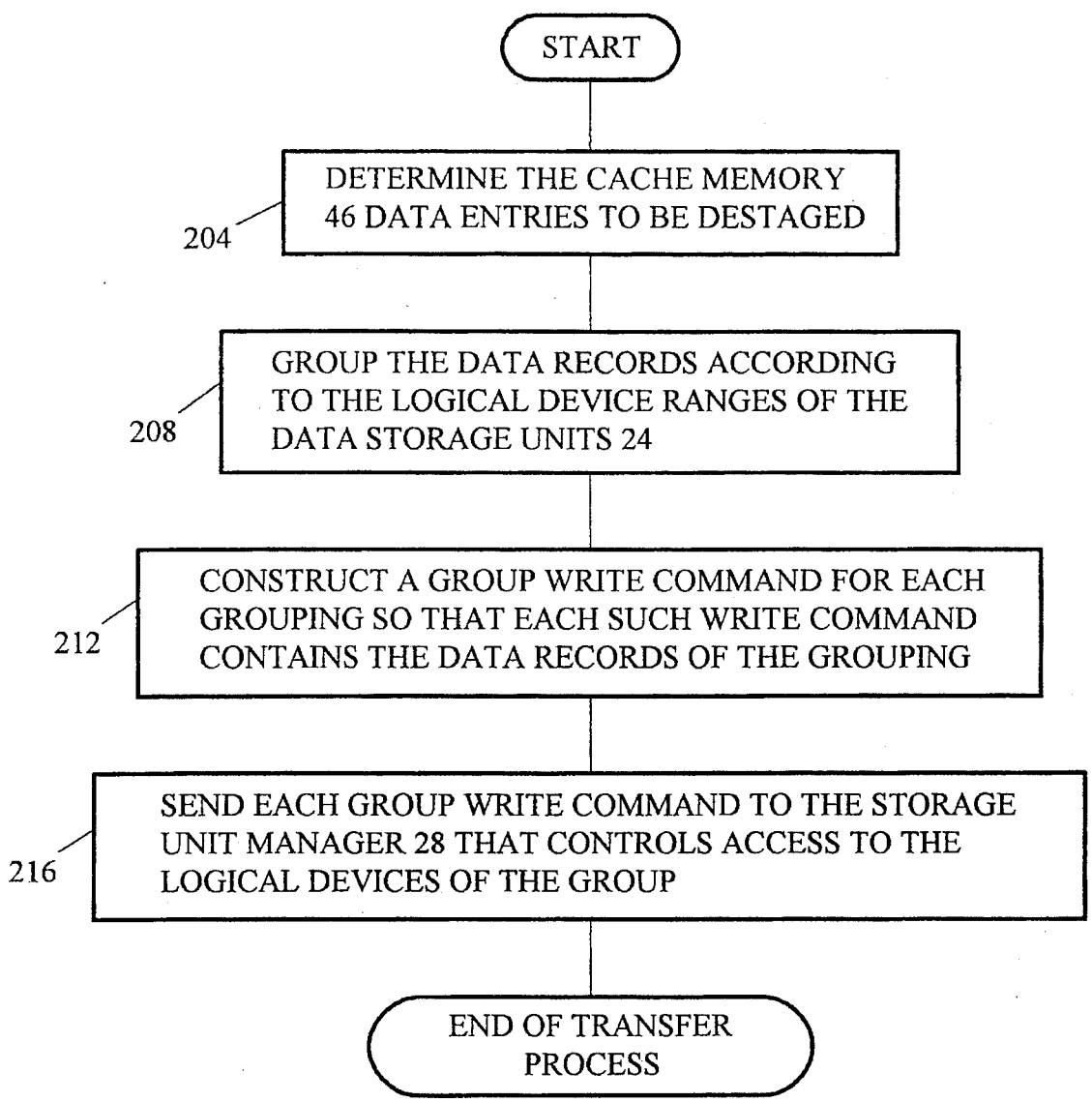
FIG. 3 is a flowchart presenting the steps executed by the storage control unit when grouping data records for destaging.

In describing the novel destaging process of this invention, there are three subprocesses that are sequentially activated. Specifically they are: (i) a process by which processor 58 determines the cache memory 46 entries whose data is to be destaged and subsequently sends write commands to the data storage units 24 (FIG. 3); (ii) a process by which a data storage unit 24 writes the data having nonsequential addresses that is to be destaged (FIG. 4); and (iii) a process, well known in the art, by which processor 58 deallocates portions of cache memory 46 once a successful write status is returned from a data storage manager 24.

Referring now to FIG. 3, once a determination is made to destage cache memory 46 data, in step 204, the cache memory 46 data entries whose data is to be destaged must be determined. There are well known ways to make this determination and none will be elaborated on here. Assuming the data entries to be destaged are determined, in step 208, the processor 58 uses the configuration table 62 to group the data records of these entries according to the logical devices of the data storage units 24. For example, let the data to be destaged be conceptually represented by a triple (D, LD, Addrs), where D is the cache memory 46 data entry to be destaged, LD is the logical device for data entry D, and Addrs is the logical data address within LD for the data entry D. If FIG. 5a represents nine data entries to be destaged and the logical device assignments are according to the configuration table 62 of FIG. 2, then the three data groups 504, 508 and 512 of FIG. 5b are the result of the grouping operation with group 504 related to data storage unit 24a, group 508 related to data storage unit 24b, and group 512 related to data storage unit 24d. Thus, each group contains the data records of cache memory 46 data entries whose logical device backing storage is assigned to a single data storage unit 24. In step 212, a data storage unit 24 write command is constructed for each group of data records (i.e., groups 504–512). Each such command contains as many of the data records of the group as possible, up to a command size preferably of one to two megabytes. Typically, a single command contains all such data records. In step 216 each previously constructed write command is sent, via a storage adaptor 54, to the data storage unit 24 providing storage for the logical devices of the command's data records. Once this is accomplished the process of FIG. 3 terminates.

Figure 4:
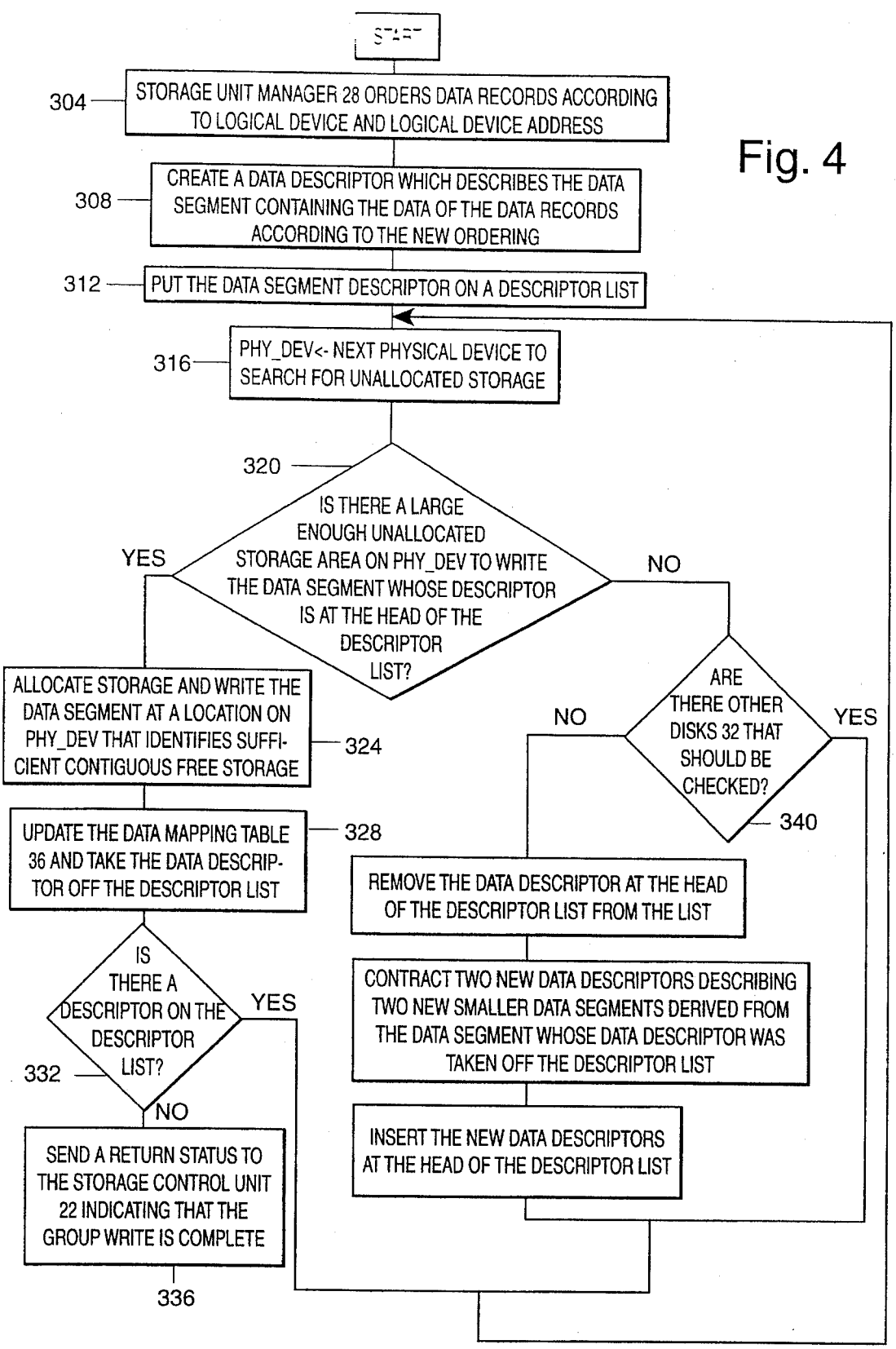
FIG. 4 is a flowchart presenting the steps executed by each storage unit manager of the backing store when writing destaged data to the backing store electromechanical storage devices.

Referring now to FIG. 4, the process is presented by which each data storage unit 24 executes a write command received from the storage control unit 22. Assuming a storage unit manager 28 receives and interprets a write command, in step 304 the storage unit manager 24 creates a list of data record references indicating a reordering of the data records within the write command. That is, the list has references to all data records with the same logical device collected together and each of these collections are ordered according to the logical device data addresses of the referenced data records. For example, let the ordering of the logical devices used in FIGS. 2 and 5 be $LD_1<LD_2<LD_3<LD_4<LD_5<LD_6$. Thus, once the three groups 504, 508 and 512 of FIG. 5b are transferred in write commands to the data storage units 24a, 24b and 24d, respectively, each group is conceptually reordered as illustrated in FIG. 5c by the storage unit manager 28 of the receiving data storage unit 24. Thus, group 504 is reordered as group 516, group 508 requires no reordering, and group 512 is reordered as group 520. In step 308, at least one initial "data descriptor" is constructed which identifies a data segment of the reordered data records. In the preferred embodiment, the storage system 10 provides a host 14 with the capability of partitioning the collection of disks 32 within a data storage unit 24 into subpartitions according to logical devices. If the storage within a data storage unit 24 is partitioned according to logical devices, then for each such subpartition one such data descriptor is constructed such that the descriptor describes the data segment referencing all the data records having the logical device related to the subpartition. Alternatively, if the storage within the data storage unit 24 is not partitioned according to logical devices, then a single data descriptor is constructed such that the described data segment contains all the data records of the group. In step 312, each data descriptor is put on a "descriptor list." This list is intended to contain data descriptors of the data segments not yet written to a disk 32. For each data descriptor on the descriptor list, the data segment described by the data descriptor is either written to a disk 32, or the data descriptor is replaced with two data descriptors describing two new data segments such that the new data segments are a decomposition of the data segment corresponding to the replaced data descriptor. In step 316, the storage unit manager 28 determines the next disk 32 whose portion of the free block table 42 is to be scanned for a location of a sufficiently large collection of free blocks on the disk 32 to store the data segment described by the data descriptor at the head of the descriptor list. This disk 32 is then assigned to the identifier "PHY_DEV." It should be noted that the determination of this disk 32 is dependent on the above discussed partitioning of the storage residing on the disks 32 controlled by the storage unit manager 28. Thus, the disk 32 assigned to PHY_DEV must be from the appropriate subpartition of disks 32 if such subpartitions have been specified. Moreover, this step preferably assigns to PHY_DEV the identity of a disk 32 least recently used to store data. Thus, repeated executions of step 316 cycle through the disks 32 connected to the storage unit manager 28 that can be assigned to PHY_DEV. In decision step 320 a determination is made as to whether there is an unallocated storage area specifying a sufficiently large collection of unallocated data blocks on PHY_DEV that can be written to continuously without interrupting mechanical delays once writing has commenced.

Since seek delay is, on average, substantially longer than latency delay, if more than one such sufficiently large unallocated storage area occurs, then one such area is chosen whereby a reduced amount of seek delay is incurred. That is, a procedure is used which reduces seek delay by locating a sufficiently large unallocated storage area such that reduced read/write head movement is required to position the head adjacent to the storage area. This is accomplished through the structure and use of the free block table 42. For each disk 32, the free block table 42 contains a collection of bits or a bit map such that: (i) the bit map contains one bit per data block on the disk 32 where the value of the bit designates whether or not that data block is allocated; (ii) the bit map is linearly ordered such that adjacent cylinder tracks on the physical medium have adjacent sections of contiguous bits in the bit map and bits within each such section are ordered in a manner insuring that data blocks, with adjacent bit map bits, can be written to continuously without mechanical delays. Thus, for example, if a disk 32 contains a single magnetic disk platter, then the disk blocks within each cylinder track are ordered according to their physical adjacency within the cylinder track.

To reduce read/write head movement during data segment storage assignment, the free block table 62 has, for each disk 32 bit map, an associated read/write head location indicator or register designating, within the bit map, the cylinder track on which the read/write head is currently positioned. When storage for a data segment of "n" data blocks is desired, a scan of the bit map is done for "n" consecutive bits within a single cylinder track such that the bits indicate that their related data blocks are unallocated. The scan commences by scanning the bits for the cylinder track designated by the read/write head location indicator and an adjacent track. If "n" consecutive bits indicating unallocated data blocks are not found, then the scan reverses direction and resumes scanning at the portion of the bit map representing the other cylinder track (if any) adjacent to the cylinder track where the read/write head is positioned. The scan proceeds through the bit map for this cylinder track and for the adjacent cylinder track (if any) next farthest away from the original cylinder track. If still no consecutive "n" bits are found designating unallocated data blocks, then the scan again reverses direction and resumes scanning at the next portion of the bit map encountered (if any) in this new direction that has not been previously scanned. Thus the scan iteratively scans back and forth through the bit map progressively scanning the next unscanned portion of the bit map representing the next closest cylinder track to the one at which the read/write head is positioned until either "n" consecutive bit values are found indicating unallocated storage, or the entire bit map for the disk 32 has been scanned and sufficient unallocated storage was not located.

If sufficient unallocated storage is indicated by a bit sequence in the bit map, then in step 324 the storage associated with this bit sequence is allocated from the free block table 42 (i.e., the bits of the sequence are switched to indicate allocated storage), the location of the storage is determined using the position of the bit sequence within the bit map (in a manner well known in the art), and the data segment is written to the newly allocated storage on PHY_DEV. It should also be noted that this step also deallocates storage for any previous copies of the data records in the data segment residing in the backing store 18. In step 328, the data mapping table 36 is updated with an entry giving the mapping between the logical address and the physical address for each data record written in step 324. Thus, if a data record has a previous copy stored on the backing store 18, then the entry in the table 36 indicating the physical location of the previous copy is removed. In addition, the data descriptor is taken off the descriptor list. In decision step 332 a determination is made as to whether there are further data segment descriptors on the descriptor list. If no further descriptors are on the descriptor list, step 336 is encountered and a return status is sent to the storage control unit 22 indicating that the destaged data has been successfully written to the backing store 18. Alternatively, if there is another data descriptor on the descriptor list, then to make the determination of where to write the data segment related to the current descriptor at the head of the descriptor list, step 316 is once again executed.

Returning now to the decision step 320, if no location is found designating a sufficiently large amount of unallocated storage available on PHY_DEV, then decision step 340 is next encountered. In this step a determination is made as to whether there are other related disks 32 in the same backing store 18 (sub)partition that have not been checked for a sufficiently large storage area to write the current data segment. If there are no further disks 32 which can be checked, then in step 344 the current data descriptor at the head of the descriptor list is removed. In step 348, two new data descriptors are constructed, each describing two smaller data segments which together include all data records of the data segment whose data descriptor was removed from the descriptor list above. Preferably, the two smaller data segments are substantially of the same size. However, it is also preferable to keep data likely to be accessed concurrently within the same data segment. In particular, it is preferable to have sequential logical addresses within the data segment being decomposed to reside within the same smaller data segment. Thus, if the data segment to be decomposed referred to the data records in group 520, then an appropriate decomposition of this data segment is indicated in FIG. 5(d). In this case, the top two data records of group 528 are sequential and therefore both are placed in the same data segment. Various heuristics can be implemented to facilitate an appropriate decomposition. For example, one such heuristic is that a new data segment can be extended as long as the difference in the size of the two new data segments is less than some predetermined value. In step 352, the new data segment descriptors are inserted at the head of the descriptor list. Subsequently, execution branches back to step 316 to determine a location to write the data segment whose descriptor is at the head of the descriptor list. Alternatively, if in step 340 there are other disks 32 that can be checked for a sufficiently large unallocated storage area, then there is an immediate branch to step 316. Thus, regardless of the decision branches taken if another disk 32 can be checked for unallocated storage, then a branch to step 316 is executed. Therefore, in the steps below step 316 the execution flow either loops back to step 316 if there is further data to write, or terminates and sends a status to the storage controller 22 in step 336.

For substantially all initial data segments derived directly from grouped data records of a write command there is at most one seek and latency delay incurred during such a write. That is, these data segments are written directly to a disk 32 without being decomposed. This is due to the fact that, preferably, each storage unit manager 24 executes well known procedures for relocating and compacting data such that unallocated disk storage fragments can be coalesced into larger contiguous unallocated storage areas during a background process when there are no data transfer requests pending. Thus, there is typically a large enough storage area for the largest data segments.

After all data for a write command has been successfully written to the backing store 18, a status is returned to the storage control unit 22. The processor 58 then deallocates the cache memory 46 occupied by the data records of the group associated with the write command and either reserves this memory for an immediately pending cache memory request, or deallocates the memory in a manner well known in the art.

Thus, the above description discloses an efficient method for destaging data such that the seek delay during destaging is substantially reduced. However, it may be thought that since the above destaging procedure can require more time for the staging process in that sequential logical addresses are not sequentially stored on the disks 32, the overall negative impact on the host 14 data transfers offsets much of the destaging advantage. This is not the case in the preferred embodiments of the invention as the following facts indicate. First, data stages are less frequent when large cache memories are employed. Thus, any lengthening of time during a staging operation is offset by fewer such operations. For example, to achieve this advantage, in typical applications, it is preferred that the cache memory 46 have at least 256 megabytes of storage. Secondly, host 14 operating systems are becoming progressively more sophisticated in determining which data blocks are likely to be accessed during future processing. Thus, increasingly hosts 14 are capable of specifying to the storage system 10 which data should be staged for future processing, therefore allowing the storage system to stage the data as a background process prior to being needed.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or other embodiments, and with the various modifications required by their particular application or uses of the invention. It is intended that the appended claims be construed to include alternative embodiments to the extent permitted by the prior art.

What is claimed is:

1. A method for destaging data in a dynamically mapped data storage system comprising:

determining a plurality of data items in a cache memory for destaging to a non-volatile backing storage means, each of said data items having a logical address obtained from a logical data addressing scheme used by a host system for accessing data items on said dynamically mapped data storage system, said logical address used in dynamically mapping a data item to a backing storage address on said backing storage means, said backing storage address obtained from a backing storage addressing scheme different from said logical data addressing scheme of the host;

performing a write command for writing said plurality of data items onto an unallocated storage area of said backing storage means, said plurality of data items including at least a first data item being stored at a location having a first logical address and a second data item being stored at a location having a second logical address with at least said first and second logical addresses being non-sequential, said step of performing including ordering said first plurality of data items according to logical addresses wherein data items having relatively closer in number logical addresses are adjacent in said ordering, said step of performing further including decomposing said first plurality of data items into a first collection of data segments wherein each data segment in said first collection is stored in an unallocated storage area of said backing storage means with each data segment having an integral number of data items and in which said step of decomposing includes using a first predetermined criterion for varying a data segment size wherein relatively closer in number logically addressed data items are kept together in the same data segment of said first collection when a second predetermined criterion is satisfied, with said second predetermined criterion including restricting the size of a first data segment wherein a maximal difference in size between said first data segment and a second data segment is less than a predetermined value such that a data item excluded from said first data segment due to said restricting step is included in said second data segment and said step of decomposing including constructing data segments from said first plurality of data items, each constructed data segment having its data items ordered by logical address such that if a third data item and a fourth data item are in said constructed data segment and a fifth data item of said first plurality of data items has a logical address between said logical addresses of said third and fourth data items, then said fifth data item is also in said constructed data segment.

2. A method as claimed in claim 1, wherein said second predetermined criterion includes:

restricting a size of a sixth data segment in said first collection, said sixth data segment having an integral first number of data items such that for a seventh data segment having an integral second number of data items, the first number is less than the second number.

3. A method, as claimed in claim 1, wherein:

said group contains no third data item having a logical address that is between the nonsequential logical addresses for said first and second data items.

4. An apparatus for destaging data in a dynamically mapped data storage system, comprising:

cache memory means for storing a plurality of data items, said data items, each having a different logical address from a logical addressing scheme used by a host system for accessing said data items;

backing storage means for providing non-volatile data storage for said plurality of data items so that each data item residing in said backing storage means is:

(A1) accessible by a disk format address from a second addressing scheme, and (A2) accessible by the host system after first being transferred to said cache memory means, with the transfer to said cache memory means using said second addressing scheme; and means for controlling a storing of a first plurality of data items from said plurality of data items in said cache memory means on to said backing storage means, said means for controlling including:

(B1) mapping means for maintaining an association between said logical address and said disk format address for each of said plurality of data items, and (B2) means for performing a first write command for writing said first plurality of data items on to an unallocated storage area of said backing storage means, said first plurality of data items including first and second data items being stored at locations having first and second non-sequential logical addresses, respectively, with each of said first and second non-sequential logical addresses being not part of the contents of said first and second data items, respectively, said first write command being a single write command during which said first and second data items are written to said unallocated storage area of said backing storage means before any subsequent write command by said means for performing, said means for performing including means for changing said mapping means so that said first and second logical addresses are correlated with sequential first and second disk format addresses, respectively, of said unallocated storage area, wherein for a third data item located at a third disk format address of an allocated storage area of said backing storage means, said third data item having a third logical address between said first and second logical addresses, the association and said mapping means between said third logical address and a third disk format address is unchanged, wherein said means for controlling storage said first plurality of data items on to said unallocated storage area without mechanical interruption after commencement of physically providing said first plurality of data items on said unallocated storage area, said means for performing a write command further includes means for ordering said first plurality of data items according to logical addresses wherein data items having relatively closer in number logical addresses on a same logical device are adjacent in the ordering, said same logical device being a partition of said backing storage means designated by the host system and a means for decomposing said first plurality of data items into a collection of data segments, each said data segment having data items ordered according to said means for ordering such that each data segment in the collection is assigned to an unallocated storage area associated with one of said data storage units; and wherein said means for controlling includes first system means and second system means in which said second system means groups data items from said plurality of data items and said first system means stores said first plurality of data items, using said means for performing a write command, simultaneously with said second system means grouping a different plurality of data items from said cache memory means in preparation for using said means for performing a different write command to write data items of said different plurality to said backing storage means.

5. An apparatus as claimed in claim 4, wherein said means for controlling includes processing means for identifying data items of said cache memory means to be destaged.

6. An apparatus as claimed in claim 4, wherein said means for controlling includes programmed means for taking into account at least one of said seek and latency delays in performing said write command.

7. An apparatus as claimed in claim 4, wherein said means for controlling includes processing means for removing said first plurality of data items from said cache memory means when a return status is received indicating storing of said first plurality of data items in said backing storage means.

8. An apparatus as claimed in claim 4, wherein said means for controlling includes:

host adapter means for transferring data between the host system and said cache memory means; and storage unit adapter means for transferring data between said cache memory means and said backing storage means.

9. An apparatus as claimed in claim 4, wherein said means for controlling includes free storage location means for providing a location of said unallocated storage area.

10. An apparatus as claimed in claim 9, wherein said free storage location means includes bit map means for providing the disk format address of said unallocated storage area.

11. An apparatus as claimed in claim 4, wherein the host system utilizes logical addresses of a number of logical devices relating to storing said first plurality of data items and each of said logical devices is associated with a single partition of said backing storage means, each logical device represented by a logical device identifier used by the host system in accessing backing storage means locations contained in the partition associated with the logical device.

12. An apparatus as claimed in claim 11, wherein said means for controlling includes:

configuration means for determining that a first partition of said backing storage means relates to at least one logical device;

processing means for grouping data items residing in said cache memory means using said configuration means.

13. An apparatus as claimed in claim 11, wherein said backing storage means and said means for controlling include a number of data storage units in which each said data storage unit stores and retrieves data independently of any other of said data storage units.

14. An apparatus as claimed in claim 13, wherein each said data storage unit has a separate data channel to said means for controlling to independently store and retrieve data.

15. An apparatus as claimed in claim 13, wherein each said data storage unit includes:

managing means for storing said first plurality of data items to and retrieving said first plurality of data items from said backing storage means.

16. An apparatus for destaging data in a dynamically mapped data storage system, comprising:

first means for determining a plurality of data items in a cache memory for destaging to a non-volatile packing storage means, each of said data items having a logical address obtained from a logical data addressing scheme used by a host system for accessing data items on said dynamically mapped data storage system, said logical address used in dynamically mapping a data item to a backing storing address on said backing storage means, said backing storage address obtained from a backing storage addressing scheme different from said logical data addressing scheme of the host; and second means for performing a write command for writing said plurality of data items on to an unallocated storage area of said backing storage means, said plurality of data items including at least a first data item being stored at a location having a first logical address and a second data item being stored at a location having a second logical address with at least said first and second logical addresses being non-sequential, said second means including means for ordering said first plurality of data items according to a logical addresses wherein data items having relatively closer in number logical addresses are adjacent in said ordering, said second means further including means for decomposing said first plurality of data items into a first collection of data segments wherein each data segment in said first collection is stored in an unallocated storage area of said backing storage means with each data segment having an integral number of data items and in which said step of decomposing includes using a first predetermined criterion for varying a data segment size where relatively closer number logically addressed data items are kept together in the same data segment of said first collection when a second predetermined criterion is satisfied, with said second predetermined criterion including restricting the size of a first data segment wherein a maximal difference in size between said first data segment and a second data segment is less than a predetermined value such that a data item excluded from said first data segment due to said restricting step is included in said second data segment and said means for decomposing including means for constructing data segments from said plurality of data items, each constructed data segment having its data items ordered by logical address such that if a third data item and a fourth data item are in said constructed data segment and a fifth data item of a said first plurality of data items has a logical address between said logical addresses of said third and fourth data items, and said fifth data item is also in said constructed data segment.

\* \* \* \* \*